United States Patent [19]

Bin

[11] Patent Number: 5,766,282
[45] Date of Patent: Jun. 16, 1998

[54] FILTERING BAGS WITH BAG FILTER LABELS

[76] Inventor: Louis Bin, 6 Place de la Reine Blanche, Asnière sur Oise, France, 95270

[21] Appl. No.: 951,741

[22] Filed: Oct. 16, 1997

Related U.S. Application Data

[63] Continuation of Ser. No. 581,423, Dec. 29, 1995, abandoned.

[30] Foreign Application Priority Data

Jan. 5, 1995 [FR] France ................................. 95 00224

[51] Int. Cl.[6] ............................................. B01D 46/02
[52] U.S. Cl. .............................. 55/361; 40/631; 55/486; 55/528; 55/529
[58] Field of Search .......................... 40/312, 299, 631; 283/81; 95/273, 291; 55/274, 361, 385.1, 486, 528, 529, DIG. 2

[56] References Cited

U.S. PATENT DOCUMENTS

| | | | |
|---|---|---|---|
| 1,093,985 | 4/1914 | French ........................... | 40/631 |
| 2,359,292 | 10/1944 | Barnett .......................... | 40/299 |
| 2,705,517 | 4/1955 | Elsas ............................ | 40/299 |
| 3,066,527 | 12/1962 | Stein ............................ | 55/274 |
| 3,635,001 | 1/1972 | Komroff et al. ................. | 55/274 |
| 4,336,038 | 6/1982 | Schultheiss .................... | 55/274 |
| 5,096,473 | 3/1992 | Sassa et al. ................... | 55/528 |
| 5,188,727 | 2/1993 | Kurth et al. ................... | 210/85 |
| 5,238,307 | 8/1993 | Mooney et al. ................. | 40/631 |
| 5,549,966 | 8/1996 | Sassa ........................... | 55/361 |

FOREIGN PATENT DOCUMENTS

| | | | |
|---|---|---|---|
| 419731 | 4/1991 | European Pat. Off. ......... | 40/299 |

*Primary Examiner*—Duane S. Smith
*Attorney, Agent, or Firm*—Dowell & Dowell,P.C.

[57] ABSTRACT

Filtering bags manufactured with materials selected to withstand specific conditions of service which include labels made of materials resistant to such conditions of service which have markings resistant to such conditions of service for the life of the filter bags. The labels are preferably incorporated in the filtering bags so as not to form filtering zones.

16 Claims, No Drawings ically-molded rim, of which the surface is of appropriate shape for the required marking.

FILTERING BAGS WITH BAG FILTER LABELS

This application is a continuation of application Ser. No. 08/581,422, filed Dec. 29, 1995, now abandoned.

BACKGROUND OF THE INVENTION

1. Field of the Invention

The present invention relates mainly to bag filters used in industry for purifying air or gases polluted in particular by dust.

2. History of the Related Art

In bag filters intended in particular for purifying polluted air or gases, these fluids pass through the filtering material by which the bags are constituted. The dust is separated from the air or gases and accumulates on the bags and tends to clog them. The bags are cleaned, most often cyclically, and the dust falls into the bottom of the filter in the form of agglomerates. The bags are thus subjected to stresses which vary depending of the nature of the dust, the nature of the gases, and the conditions of filtration (temperature, pressure drop, etc . . . ), and design of the bag filter. This results, for each application, in conditions of service which the filtering bag must satisfy, including during cleaning. In the majority of applications, among all these conditions of service, the conditions of temperature and of corrosion prevent the use of conventional techniques of identification for the filtering bags. Yet such an identification of each bag is necessary for rationalizing the use of such a filter: determination of the life duration of the bags, verification of the nature of the filtering material in the event of trouble or especially at the end of use in order to reliably determine the elimination method, linkage between the behavior in situ and the conditions of manufacture, etc . . . . Another difficulty is associated with the function of filtration of the filtering material which might be created by a marking on the filtration material itself, which would allow dust to pass, thus contaminating the purified air or gases.

It is an object of the present invention to bring a simple and efficient solution to identifying the filtering bags of bag filters for their entire life cycle.

SUMMARY OF THE INVENTION

To that end, a filtering bag manufactured with materials selected to withstand the conditions of service specified for the use desired is characterized, according to the invention, in that:

a) the filtering bag includes a label made of materials resistant to the conditions of temperature and corrosion specified for the filtering bag, b) the label incorporates a marking resistant to the conditions of temperature and corrosion specified for the filtering bag, and c) the label is incorporated in said filtering bag by a means resistant to the service conditions specified for the filtering bag.

The label is preferably incorporated in the filtering bag so as not to constitute a filtering zone.

DESCRIPTION OF PREFERRED EMBODIMENT

The invention will be more readily understood on reading the following detailed description. The term filtering bag is understood, within the meaning of the present invention, as an element made of filtering material, installed in a filter intended to purify by filtration a gaseous or liquid fluid, which is polluted by solid and/or liquid particles (called dust, aerosol or matters in suspension). Such a filter is qualified as a bag filter within the meaning of the present invention.

The filtering bags are very often made by first cutting out a piece of appropriate shape in a filtering material in the state of fabric of the felt type, i.e. constituted by a screen providing mechanical strength and coated with fibrous filtering materials, for example a polytetrafluoroethylene (PTFE) screen with fibrous materials in polyphenylenesulphite (PPS) or polyimide (P84) or polytetrafluoroethylene (PTFE). This piece is then sewn with a thread of appropriate material to form a bag as designed for the filter in question; for example in polytetrafluoroethylene (PTFE) for the above felt. Depending on the conditions of service which the filtering bag must satisfy, a choice is made for the fabric and the thread, particularly by selecting materials adapted to the conditions of temperature and of corrosion. Within the meaning of the present invention, such service conditions include the conditions resulting from a cleaning phase. According to the invention, a label is incorporated in the filtering bag by a means resistant to the service conditions specified for the filtering bag. Within the meaning of the invention, the term label is understood to mean a surface on which the required marking may be made, this surface preferably being non-filtering, i.e. not traversed by the fluid to be purified when this fluid traverses the filtering bag in order to be filtered. In a preferred variant of the invention, the label is made with the filtering material selected for the filtering bag, for example by cutting out in the filtering material chosen a piece of such shape that, after the filtering bag has been made and installed in the filter, a part of the surface of the filtering material does not filter the air or gases to be purified and thus constitutes the label. Such a label is thus perfectly incorporated in the filtering bag by a means perfectly resisting the service conditions specified for the filtering bag, since it is the filtering material itself. The marking resistant to the temperature and corrosion conditions specified for the filtering bag may be of several types: mark, series number, number of order of manufacture, material codes, alphanumerical characters, logo, etc . . . . Such marking may for example, be made by sewing stitches or points, made with the same thread as selected to make the filtering bag, in the form of signs constituted by straight or curved lines. In a preferred variant where the filtering material is a felt, the screen is totally or partially free of the fibrous filtering materials on the surface constituting the label. This facilitates marking by spaced apart "points" materializing signs constituted by straight or curved lines. Such points may be of various shapes as a function, in particular, of the mode of producing these points by mechanical, physical or chemical means. This variant of incorporation of the label using the filtering material itself both for making the label and as means for incorporation in the filtering bag complicates the production of the marking since it may be necessary to manipulate during marking the filtering bags themselves which may be of large dimensions. In another preferred variant, marking is simpler to effect: the label is first made as a separate piece, using the filtering material chosen for the filtering bag or other materials resistant to the temperature and corrosion conditions specified for the filtering bag. These labels are then marked with a marking resistant to the temperature and corrosion conditions specified for the filtering bag, for example with a marking as described hereinbefore. The label thus marked is preferably incorporated in the filtering bag by sewing, over a non-filtering zone of the filtering bag and provided to that end, with thread selected to make the filtering bag. In another variant, the sewing of the label in the bag is part of the sewing process necessary for making the filtering bag itself.

The filtering bags may also be made, according to the state of the art, by manufacturing the filtering material itself directly in the form specified for the filtering bag, often called a "cartridge". This avoids the need to cut-out and assemble the bag and makes it possible to provide a zone constituting the label or a zone where a label may be added in manner similar to that described hereinbefore.

What is claimed is:

1. In a filtering bag for bag filters intended for purifying air or gases polluted by dust, and which is manufactured of a filtering material selected to withstand conditions of service specified for the filtering bag during the duration of the life cycle of the filtering bag, including temperature and corrosion resistance, the improvement comprising:
   a) the filtering bag includes a label made of materials resistant to the conditions of temperature and corrosion specified for the filtering bag,
   b) said label including a marking resistant to the conditions of temperature and corrosion specified for the filtering bag, and
   c) said label being incorporated in the filtering bag by a means resistant to the conditions of service specified for the filtering bag, wherein the filtering bag is identifiable during the entire filtering bag life cycle.

2. The filtering bag of claim 1, wherein said label is incorporated in the filtering bag at a surface not traversed by a fluid to be purified when the fluid traverses the filtering bag so as not to form a filtering zone.

3. The filtering bag of claim 2, wherein said label is incorporated in the filtering bag by means of thread resistant to the conditions of service specified for the filtering bag.

4. The filtering bag of claim 3, wherein said label is sewn to the filtering bag as part of a sewing process necessary for making the filtering bag from the filtering material.

5. The filtering bag of claim 2, wherein said label is made from the same material as the filtering material.

6. The filtering bag of claim 3, wherein the filtering material includes a screen supporting a fibrous filtering material surface and said label being formed of the filtering material free of the fibrous filtering material surface.

7. The filtering bag of claim 6, wherein said screen is formed of polytetrafluoroethylene and said fibrous filtering surface is selected from the group of materials consisting of polyphenylene-sulphite, polyimide and polytetrafluoroethylene and said thread is made of polytetrafluoroethylene.

8. The filtering bag of claim 3, wherein said marking includes sewn signs having straight or curved lines.

9. The filtering bag of claim 3, wherein said marking includes signs defined by spaced points obtained by a point forming process selected from the group consisting of mechanical, physical and chemical processes.

10. The filtering bag of claim 1, wherein said marking includes sewn signs having straight or curved lines.

11. The filtering bag of claim 1, wherein said label is integrally formed with the filtering material at a surface not traversed by a fluid to be purified when the fluid traverses the filtering bag so as not to form a filtering zone.

12. The filtering bag of claim 3, wherein said thread is composed of the same material as the filtering material.

13. In a filtering bag for bag filters intended for purifying air or gases polluted by dust, and which is manufactured of a filtering material selected to withstand conditions of service specified for the filtering bag, including temperature and corrosion resistance, the improvement comprising:
   a) the filtering bag includes a label made from the same material as the filtering material,
   b) said label including a marking resistant to the conditions of temperature and corrosion specified for the filtering bag, and
   c) said label being incorporated in the filtering bag by a means resistant to the conditions of service specified for the filtering bag.

14. The filtering bag of claim 13, wherein said label is incorporated in the filtering bag by means of thread resistant to the conditions of temperature and corrosion specified for the filtering bag.

15. The filtering bag of claim 14, wherein said thread is composed from the same material as the filtering material and the label material.

16. A filtering bag for bag filters intended for purifying air or gases polluted by dust, and which is manufactured of a filtering material selected to withstand conditions of temperature and corrosion resistance and to withstand conditions of cleaning specified for the filtering bag, comprising:
   a) a label composed of materials selected to be resistant to the conditions of temperature, corrosion and cleaning specified for the filtering bag, said label comprising a surface of said filtering bag which is not traversed by a fluid to be purified when the fluid traverses the filtering bag;
   b) a marking on said label, said marking being resistant to the conditions of temperature, corrosion and cleaning specified for the filtering bag; and
   c) a means for incorporating said label in the filtering bag, said means for incorporating being resistant to the conditions of temperature, corrosion and cleaning specified for the filtering bag, wherein the filtering bags are identifiable all along their life cycle.

* * * * *